United States Patent [19]

Royer

[11] Patent Number: 5,162,686
[45] Date of Patent: Nov. 10, 1992

[54] MOTOR ROTOR HAVING MAGNETS
[75] Inventor: Laurent Royer, Dijon, France
[73] Assignee: GEC Alsthom SA, Paris, France
[21] Appl. No.: 730,870
[22] PCT Filed: Nov. 27, 1990
[86] PCT No.: PCT/FR90/00857
    § 371 Date: Jul. 19, 1991
    § 102(e) Date: Jul. 19, 1991
[87] PCT Pub. No.: WO91/08607
    PCT Pub. Date: Jun. 13, 1991
[30] Foreign Application Priority Data
    Nov. 27, 1989 [FR] France ............... 89 15550
[51] Int. Cl.⁵ .......................................... H02K 21/12
[52] U.S. Cl. ...................................... 310/156; 310/42;
                                            310/91; 310/218; 310/261
[58] Field of Search .............. 310/156, 216, 217, 218,
        310/261, 42, 91, 162, 152, 264, 265, 269; 29/598
[56] References Cited
    U.S. PATENT DOCUMENTS
    2,043,010  6/1936  Reis ..................... 310/156

3,979,821  9/1976  Noodleman ................ 310/42
4,445,062  4/1984  Glaser ................... 310/156
4,663,551  5/1987  Weh et al. .............. 310/152
5,091,668  2/1992  Cuenot et al. ........... 310/156

FOREIGN PATENT DOCUMENTS
2048432  3/1971  France .

Primary Examiner—R. Skudy
Attorney, Agent, or Firm—Sughrue, Mion, Zinn, Macpeak & Seas

[57] ABSTRACT

A rotor for a motor having magnets, the rotor comprising a rotary shaft and at least one pair of magnetic poles with magnets disposed therebetween having azimuth magnetization, the rotor being characterized in that the poles and the magnets are fixed to each other and to the rotor by a section member (30) of constant thickness having a section with as many lobes (31, 32, 33, 34) as there are poles in the motor, said lobes being interconnected in pairs by curved portions, (41, 42, 43, 44) which are substantially circular arcs of diameter close to that of the shaft (1) of the motor. The invention is applicable to a synchronous motor having magnets.

7 Claims, 3 Drawing Sheets

MOTOR ROTOR HAVING MAGNETS

The present invention relates to a rotor for a motor having magnets and it applies in particular to providing a synchronous motor having permanent magnets.

One of the major problems encountered in providing motors having magnets is the problem of fitting together the laminations and the magnets and of fitting them all on the shaft of the motor. The fixing must be robust in order to withstand various types of mechanical stress (forces due to the centrifugal effect, transmitting torque between the rotor and its shaft).

In addition, the type of fixing used must be cheap and must also lead to short assembly times.

The present invention provides a rotor for a motor having magnets, the rotor comprising a rotary shaft and at least one pair of magnetic poles with magnets disposed therebetween having azimuth magnetization, the rotor being characterized in that the poles and the magnets are fixed to each other and to the rotor by a section member of constant thickness having a section with as many lobes as there are poles in the motor, said lobes being interconnected in pairs by curved portions which are substantially circular arcs of diameter close to that of the shaft of the motor.

Advantageously, said section member is made of a material selected from the group comprising: aluminum alloys, copper alloys, austenitic stainless steel, glass fiber, and carbon fiber.

In a particular embodiment, the laminations of the rotor are assembled by means of end plates clamped together by threaded rods provided with nuts.

In a variant, the laminations of the rotor are assembled by means of end plates clamped together by smooth rods provided with grip rings.

In another variant, the laminations of the rotor are assembled by means of end plates clamped together by rivets.

Means may be provided for reinforcing the section member, e.g. steel split tubes engaged in the lobes thereof.

The invention will be well understood from the following description of a preferred embodiment of the invention given with reference to the accompanying drawings, in which.

The chosen example is a four-pole motor.

Figure 1:
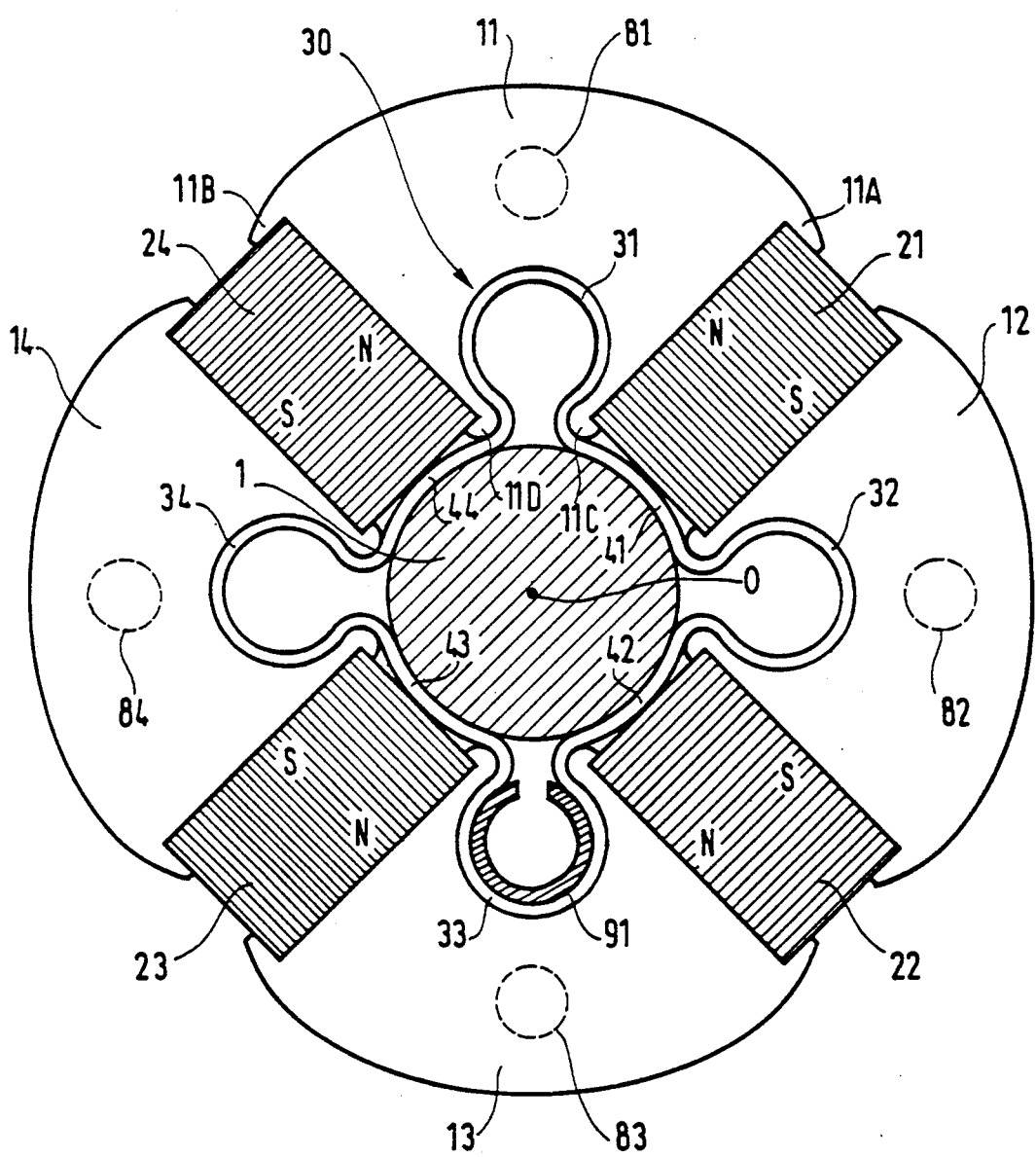
FIG. 1 is a cross-section through a rotor of the invention on a plane perpendicular to its axis of rotation.

In FIG. 1, reference 1 designates a shaft having four magnetic poles laminations or pockets 11, 12, 13, and 14 including holes 81, 82, 83 and 84 disposed thereabout, the poles being made up of cutout magnetic laminations which are clamped together by means described below. Permanent magnets 21, 22, 23, and 24 are placed between the laminations, with the magnetization of the magnets being azimuth magnetization, i.e. perpendicular to the axis O of the shaft and to radii extending therefrom. Any pair of adjacent magnets face each other via poles of the same name, i.e. North (N) or South (S).

The magnets are disposed in housings lying between the laminations. They are held radially by polar extensions of the poles such as those referenced 11A and 11B for the pole 11.

The magnet and pole assembly is fixed by means of a section member 30 which is preferably made of non-magnetic material, e.g. selected from the group constituted by aluminum alloys, copper alloys, austenitic stainless steel, glass fiber, and carbon fiber. The section member fits round the shaft 1. It is of constant thickness and is in the form of four almost-closed circular lobes 31, 32, 33, and 34. The lobes are interconnected in pairs by circular arc portions having the same diameter as the shaft. These portions referenced 41, 42, 43, and 44 come into close contact with the shaft.

Figure 2:
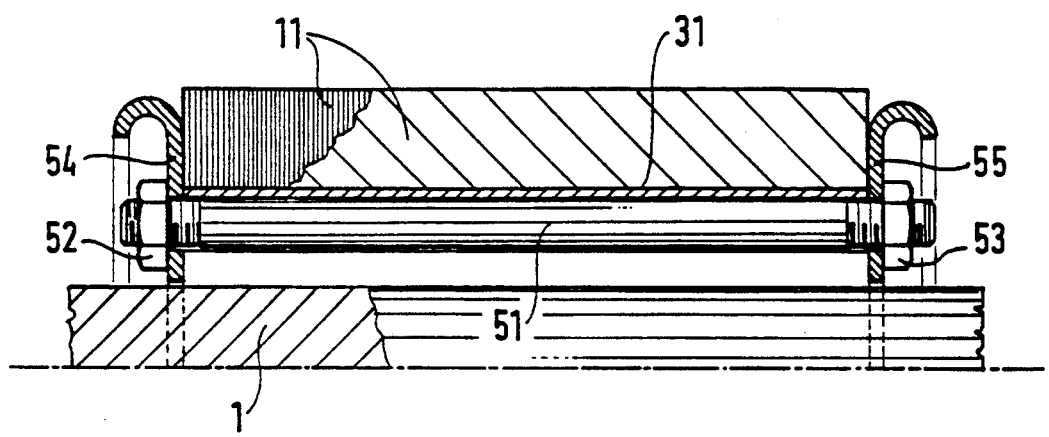
FIG. 2 is an axial half-section through a rotor whose components are assembled by means of threaded rods.

FIG. 2 shows one way of fixing the laminations in which threaded rods 51 are inserted inside the lobes and are provided with nuts 52 and 53 which clamp the laminations 11 together via interposed end plates 54 and 55. The end plates also serve as longitudinal abutments for the magnets.

Figure 3:
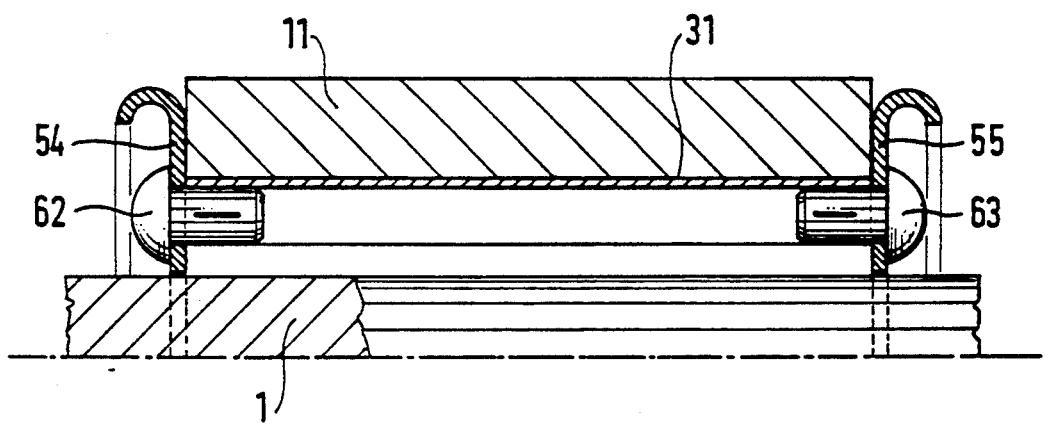
FIG. 3 is an axial half-section through a rotor whose components are assembled by rivets.

FIG. 3 shows a variant in which the laminations and the magnets are fixed to the rotor by means of the same end plates 54 and 55, but in which the end plates are now fixed by means of rivets 62 and 63 mounted in a press, the rivets preferably being made of a non-magnetic material.

Figure 4:
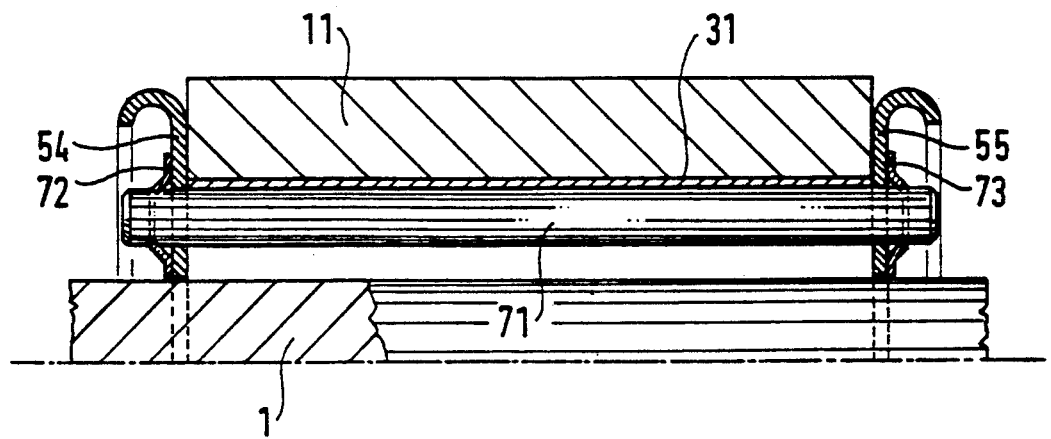
FIG. 4 is an axial half-section through a rotor whose components are assembled by smooth rods associated with grip rings.

In another variant shown in FIG. 4, the same end plates 54 and 55 are clamped together by means of smooth rods 71 which co-operate with grip rings 72 and 73.

In the above-described examples, the assembly members (smooth or threaded rods, rivets) are inserted inside the lobes of the section member and also serve to reinforce the section member. In a variant, these assembly members may be inserted in holes through the laminations in conventional manner. Such holes are represented by dashed lines referenced 81 to 84 in FIG. 1.

Under such circumstances, means may be provided for reinforcing the section member. These means may be constituted, for example, by split tubes 91 of a resilient metal such as steel, which tubes are inserted inside the volumes delimited by the lobes. One of these tubes 91 is shown in FIG. 1. These tubes tend to expand radially, thereby increasing the pressure applied on the shaft of the rotor by the section member.

Figure 5:
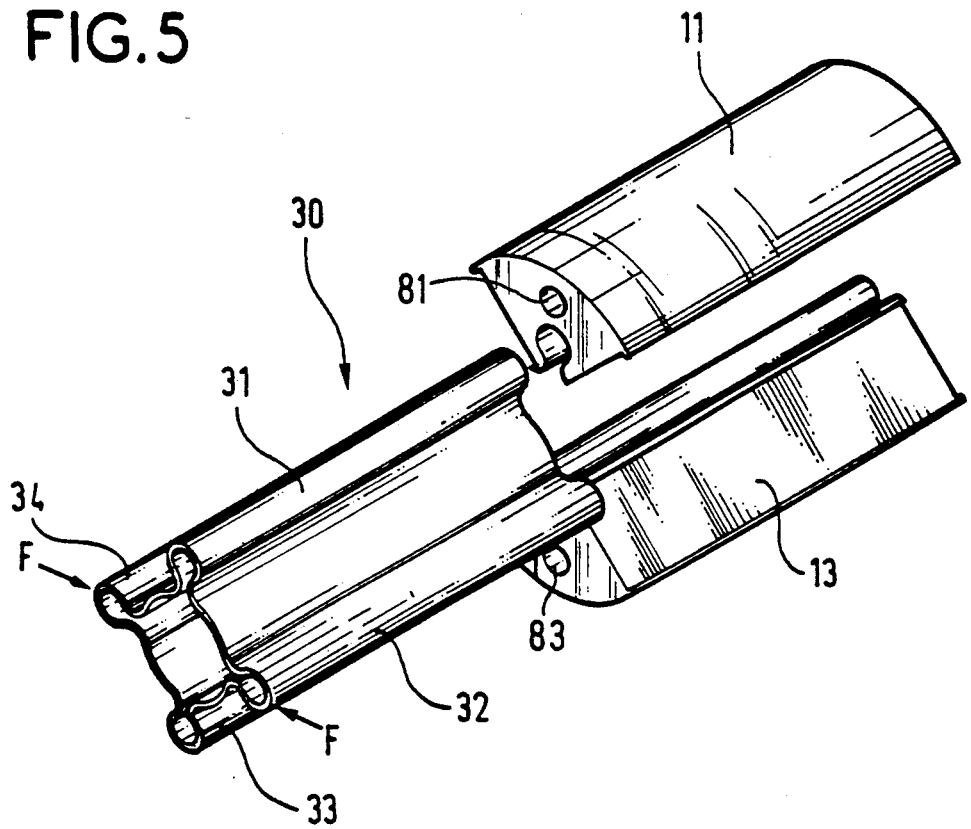
FIGS. 5 and 6 show how the rotor laminations are mounted on the section member.
Figure 6:
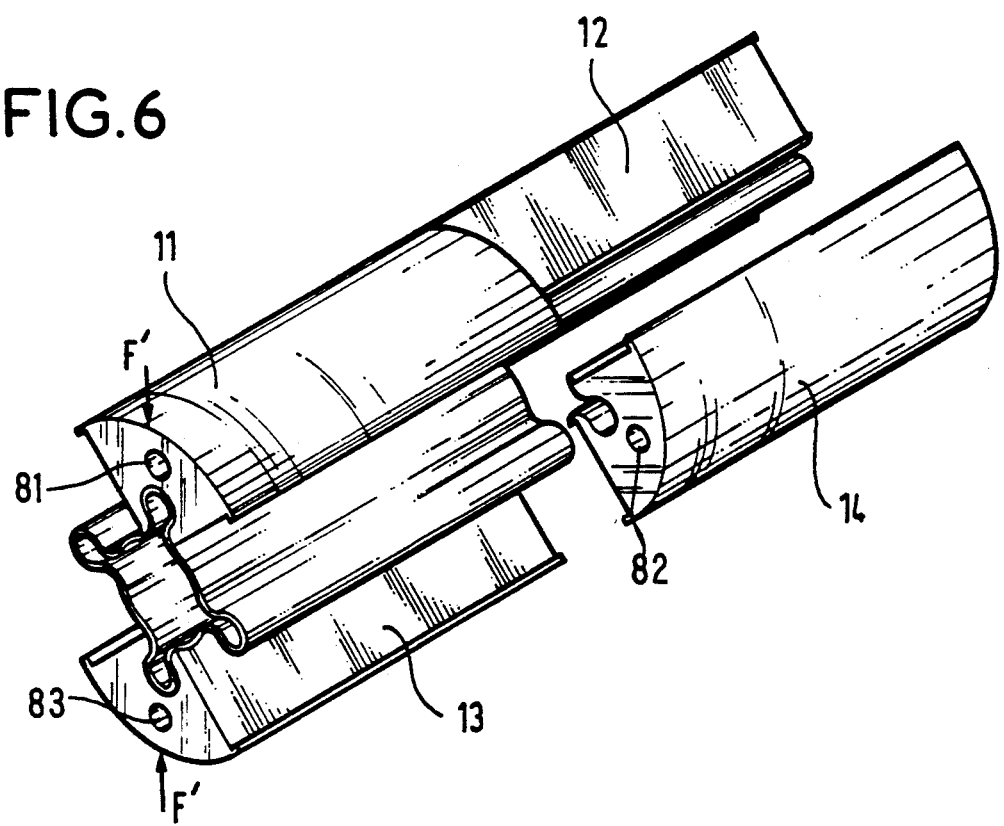

FIGS. 5 and 6 illustrate how the rotor laminations are assembled. The laminations are cut out and preassembled, e.g. by a method in which each lamination is punched so as to have a cavity in one face and a projection in the opposite face, the projection of one lamination co-operating with the cavity in the adjacent lamination, (which method is known under the name Fastec method).

Two opposite packets 11 and 13 are assembled by engaging them on the lobes 31 and 33. To facilitate sliding, diametrically opposite forces F are applied to the other lobes 32 and 34. To put the packets 12 and 13 in place, diametrically opposite forces F' are applied to the already installed packets 11 and 13.

Since the section member is resilient, the laminations remain held in place when the forces F or F' are removed.

The magnets may be assembled by hand in the corresponding housings.

The invention is applicable to multipolar synchronous motors having magnets.

I claim:

1. A rotor for a motor having magnets, the rotor comprising a rotary shaft and at least one pair of magnetic poles made of laminations with said magnets disposed therebetween having azimuth magnetization, the rotor being characterized in that the poles and the magnets are fixed to each other and to the rotor by a section member (30) of constant thickness having a section with as many lobes (31, 32, 33, 34) as there are said poles in the motor, said lobes being interconnected in pairs by curved portions (41, 42, 43, 44) which are substantially circular arcs of diameter close to that of the shaft (1) of the motor.

2. A rotor according to claim 1, characterized in that said section member is made of a material selected from the group comprising: aluminum alloys, copper alloys, austenitic stainless steel, glass fiber, and carbon fiber.

3. A rotor according to claim 1, characterized in that it includes means (91) for reinforcing the section member (30).

4. A rotor according to claim 3, characterized in that said means comprise split tubes (91) of resilient metal engaged inside the lobes.

5. A rotor according to claim 1, characterized in that the laminations (11, 12, 13, 14) of the rotor are assembled by means of end plates (54, 55) clamped together by threaded rods (51) provided with nuts (52, 53).

6. A rotor according to claim 1, characterized in that the laminations (11, 12, 13, 14) of the rotor are assembled by means of end plates (54, 55) clamped together by smooth rods (71) provided with grip rings (72, 73).

7. A rotor according to claim 1, characterized in that the laminations (11, 12, 13, 14) of the rotor are assembled by means of end plates (54, 55) clamped together by rivets (62, 63).

* * * * *